(12) United States Patent
Eells

(10) Patent No.: US 9,777,853 B2
(45) Date of Patent: Oct. 3, 2017

(54) VALVE ASSEMBLY FOR CONTROLLING FLUID COMMUNICATION BETWEEN FLUID CHAMBERS, INFLATABLE DEVICE, AND METHOD

(71) Applicant: Aeris Technology LLC, Bloomington, IN (US)

(72) Inventor: Robert Eells, Bloomington, IN (US)

(73) Assignee: AERIS TECHNOLOGY LLC, Bloomington, IN (US)

( * ) Notice: Subject to any disclaimer, the term of this patent is extended or adjusted under 35 U.S.C. 154(b) by 0 days.

(21) Appl. No.: 15/263,798

(22) Filed: Sep. 13, 2016

(65) Prior Publication Data

US 2016/0377189 A1 Dec. 29, 2016

Related U.S. Application Data

(62) Division of application No. 14/303,768, filed on Jun. 13, 2014, now Pat. No. 9,456,701.

(51) Int. Cl.

| F16K 15/18 | (2006.01) |
|---|---|
| A47C 27/08 | (2006.01) |
| F16K 31/56 | (2006.01) |
| F16K 11/10 | (2006.01) |
| F16K 17/36 | (2006.01) |
| A47C 27/10 | (2006.01) |

(52) U.S. Cl.
CPC .......... *F16K 15/185* (2013.01); *A47C 27/081* (2013.01); *A47C 27/10* (2013.01); *F16K 11/10* (2013.01); *F16K 17/36* (2013.01); *F16K 31/56* (2013.01); *Y10T 137/0396* (2015.04); *Y10T 137/3584* (2015.04)

(58) Field of Classification Search
CPC ... A47C 27/081; A47C 27/082; A47C 27/083; A47C 27/084; A47C 27/10; F16K 1/14; F16K 15/185; F16K 17/36; F16K 17/366; A61G 7/05769; A61G 7/05776
USPC ...................................... 137/38, 43; 251/338
See application file for complete search history.

(56) References Cited

U.S. PATENT DOCUMENTS

| 2,623,574 A | 12/1952 | Damsch |
| 2,842,783 A | 7/1958 | Druck |
| 3,017,642 A * | 1/1962 | Rosenberg ........... A47C 27/084 |
| | | 297/DIG. 3 |
| 3,042,941 A | 7/1962 | Marcus |
| 3,128,480 A | 4/1964 | Lineback |
| 3,297,023 A | 1/1967 | Foley |
| 3,705,429 A | 12/1972 | Nail |
| 3,736,604 A | 6/1973 | Carson, Jr. |
| 3,760,845 A * | 9/1973 | Atkinson .................. F16K 1/14 |
| | | 137/625.66 |

(Continued)

*Primary Examiner* — Eric Kurilla
(74) *Attorney, Agent, or Firm* — Mattingly Burke Cohen & Biederman LLP

(57) ABSTRACT

A valve assembly for controlling fluid communication between fluid chambers in a device such as an inflatable device includes a valve body having first and second ports for fluidly connecting to first and second fluid chambers, and defining a plurality of primary valve seats in series between the ports. A plurality of compound valves are within the valve body and each includes a primary valve member movable to close or open one of the primary valve seats, and a secondary valve member movable to close or open a secondary valve seat in the primary valve member.

6 Claims, 3 Drawing Sheets

(56) References Cited

U.S. PATENT DOCUMENTS

| | | | |
|---|---|---|---|
| 3,970,098 A * | 7/1976 | Boswank | F16K 17/36 137/39 |
| 3,996,951 A * | 12/1976 | Parr | B08B 7/02 137/43 |
| 4,005,724 A * | 2/1977 | Courtot | F16K 17/366 137/38 |
| 4,269,213 A * | 5/1981 | Sasaki | F16K 17/366 137/38 |
| 4,274,431 A * | 6/1981 | Keller | B60K 15/03519 137/43 |
| 4,325,398 A * | 4/1982 | Green | F16K 17/366 137/202 |
| 4,735,226 A * | 4/1988 | Szlaga | B60K 15/03519 137/43 |
| 4,745,939 A * | 5/1988 | Greer | F16K 17/36 137/38 |
| 4,862,538 A | 9/1989 | Spann et al. | |
| 4,899,406 A | 2/1990 | Sanderson et al. | |
| 4,908,895 A | 3/1990 | Walker | |
| 4,914,771 A | 4/1990 | Afeyan | |
| 5,090,076 A | 2/1992 | Guldager | |
| 5,100,099 A * | 3/1992 | D'Agostino | F16K 1/14 137/901 |
| 5,241,988 A * | 9/1993 | Haynes | B67D 1/0042 137/595 |
| 5,333,336 A | 8/1994 | Langsam | |
| 5,346,104 A * | 9/1994 | Jeong | B65D 83/36 137/38 |
| 5,402,818 A * | 4/1995 | Kasugai | B60K 15/03519 137/198 |
| 5,412,822 A | 5/1995 | Kelly | |
| 5,727,270 A * | 3/1998 | Cope | A47C 27/081 141/114 |
| 5,894,966 A * | 4/1999 | Bobey | A61G 7/015 137/223 |
| 5,918,336 A | 7/1999 | Lee et al. | |
| 5,970,550 A | 10/1999 | Gazes | |
| 6,003,546 A * | 12/1999 | Thanscheidt | B60C 29/064 137/223 |
| 6,206,654 B1 | 3/2001 | Cassidy | |
| 6,463,610 B1 | 10/2002 | Shulte et al. | |
| 6,546,580 B2 | 4/2003 | Shimada | |
| 6,715,174 B2 | 4/2004 | Tsai | |
| 6,779,560 B1 * | 8/2004 | Reis | F16K 1/14 137/864 |
| 6,840,263 B2 * | 1/2005 | Palvolgyi | F16K 17/36 137/202 |
| 6,886,204 B2 | 5/2005 | Kasatshko et al. | |
| 6,922,863 B2 | 8/2005 | Giori et al. | |
| 7,039,972 B2 | 5/2006 | Chaffee | |
| 7,150,060 B1 | 12/2006 | Wu | |
| 7,181,795 B2 | 2/2007 | Wu | |
| 7,219,380 B2 | 5/2007 | Beck et al. | |
| 7,234,183 B2 | 6/2007 | Elrod et al. | |
| 7,234,184 B2 | 6/2007 | Yang | |
| 7,376,996 B2 | 5/2008 | Landi et al. | |
| 7,766,034 B2 * | 8/2010 | Talaski | F16K 15/044 137/533.11 |
| 7,886,386 B2 | 2/2011 | Balonick et al. | |
| 8,037,560 B2 | 10/2011 | Goldner | |
| 8,109,285 B2 * | 2/2012 | Ehrman | F16K 17/36 137/202 |
| 8,181,295 B1 | 5/2012 | Mallinger | |
| 9,456,701 B2 * | 10/2016 | Eells | A47C 27/081 |
| 2003/0159218 A1 * | 8/2003 | Lin | A47C 4/54 5/710 |
| 2004/0046135 A1 * | 3/2004 | Wieder | F16K 31/122 251/63.6 |
| 2004/0172764 A1 | 9/2004 | Henley et al. | |
| 2005/0126638 A1 * | 6/2005 | Gilbert | F16K 15/044 137/539 |
| 2006/0174416 A1 * | 8/2006 | Wu | A47C 27/10 5/710 |
| 2007/0118993 A1 | 5/2007 | Bates | |
| 2007/0169272 A1 | 7/2007 | Wu | |
| 2010/0314126 A1 * | 12/2010 | Kellner | E21B 34/14 166/373 |
| 2011/0094040 A1 | 4/2011 | deGreef et al. | |
| 2011/0154574 A1 | 6/2011 | Hrubant et al. | |
| 2013/0126771 A1 * | 5/2013 | Wang | F04B 33/00 251/321 |
| 2014/0298589 A1 * | 10/2014 | Bailey | A47C 27/10 5/710 |

* cited by examiner

VALVE ASSEMBLY FOR CONTROLLING FLUID COMMUNICATION BETWEEN FLUID CHAMBERS, INFLATABLE DEVICE, AND METHOD

This Application is a Divisional of U.S. patent application Ser. No. 14/303,768, now U.S. Pat. No. 9,456,701, filed Jun. 13, 2014.

TECHNICAL FIELD

The present disclosure relates generally to valve assemblies, and more particularly to a valve assembly with a plurality of compound valves where a primary valve member forms a valve seat and a secondary valve member controls fluid communication through the seat in the primary valve member, to control fluid communication between fluid chambers.

BACKGROUND

Few areas of modern mechanical technology are more extensive or diverse than valves. Poppet valves, spool valves, electrically actuated valves, check valves and many other permutations and combinations of these and other valve types are used to control fluid communication between and among fluid spaces. While the diversity of applications in which valves and valve assemblies are used makes it difficult to generalize to operational and manufacturing concerns, there will always be premiums upon simplicity and reliability of operation.

Certain consumer goods such as inflatable mattresses, so-called "bounce houses," and inflatable rafts, and many other devices for home or industrial use employ fluid valves for various purposes. Most individuals will be familiar with the aggravation that can be caused by unreliable or difficult to operate valves found in such devices. Many conventional valves can also be either unreliable or expensive.

The present disclosure is directed to one or more of the problems or shortcomings set forth above.

SUMMARY

In one aspect, a valve assembly for controlling fluid communication between a first fluid chamber and a second fluid chamber includes a valve body having formed therein a first port and a second port for fluidly connecting to the first and second fluid chambers, respectively, and defining a plurality of primary valve seats positioned in series fluidly between the first and second ports. A plurality of compound valves are positioned within the valve body and each includes a primary valve member movable between a closed position blocking one of the primary valve seats, and an open position, and a secondary valve member. Each of the primary valve members defines a secondary valve seat, and each of the secondary valve members is movable between a closed position blocking the corresponding secondary valve seat, and an open position.

In another aspect, a multi-chamber inflatable device includes an inflatable body defining a first fluid chamber and a second fluid chamber. A valve assembly is positioned at least partially within the inflatable body, and includes a valve body having formed therein a first port fluidly connected to the first fluid chamber, and a second port fluidly connected to the second fluid chamber. The valve body defines a plurality of primary valve seats positioned in series fluidly between the first and second ports. The valve assembly further includes a plurality of compound valves positioned within the housing and each including a primary valve member movable between a closed position blocking one of the primary valve seats and an open position, and a secondary valve member. Each of the primary valve members defines a secondary valve seat, and each of the secondary valve members is movable between a closed position blocking one of the secondary valve seats, and an open position.

In still another aspect, a method of controlling fluid communication between a first fluid chamber and a second fluid chamber includes flipping over or inverting a valve assembly including a valve body having formed therein a first port and a second port fluidly connected to the first and second fluid chambers, respectively. The method further includes moving a plurality of primary valves within the valve body to contact a plurality of primary valve seats defined by the valve body and positioned in fluid series between the first and second ports, in response to flipping over the valve assembly. The method still further includes moving a plurality of secondary valves within the valve body to contact a plurality of secondary valve seats each defined by one of the primary valves, in response to flipping over the valve assembly, and blocking fluid communication between the first fluid passage and the second fluid passage via the moving of the primary and secondary valves.

DETAILED DESCRIPTION

Figure 1:
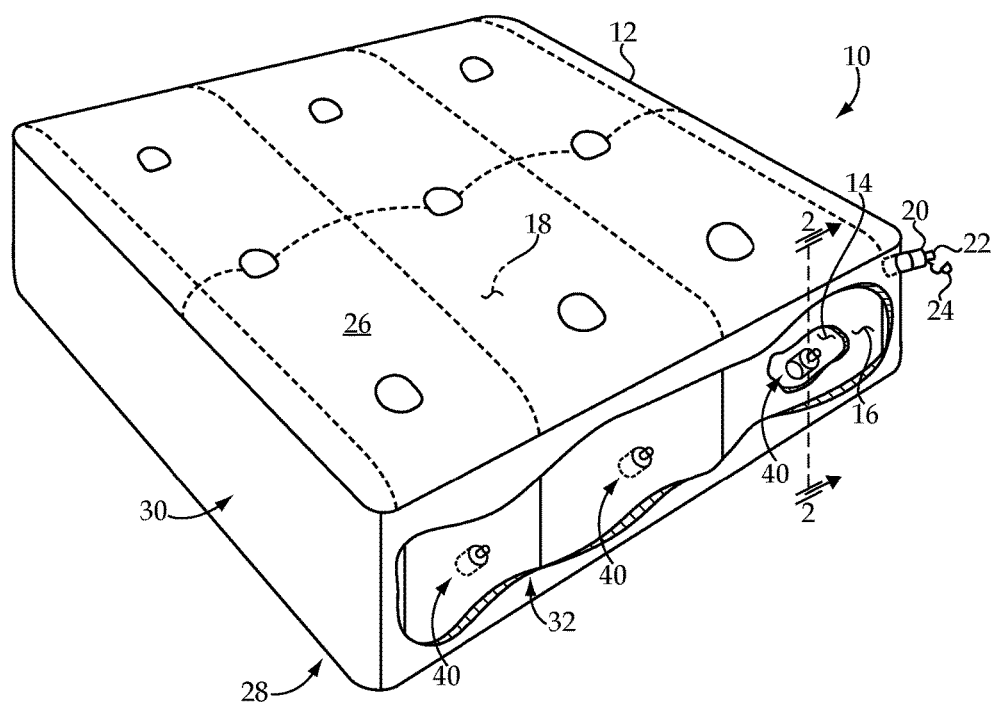
FIG. 1 is a perspective view of an inflatable device, partially in cutaway, according to one embodiment.

Referring to FIG. 1, there is shown a multi-chamber inflatable device 10 according to one embodiment. Device 10 is shown in the form of an inflatable mattress or cushion having an inflatable body 12 defining a first fluid chamber 14, a second fluid chamber 16, a third fluid chamber 18, and a plurality of additional fluid chambers each forming a cell within the inflatable mattress or cushion. In the illustrated embodiment, inflatable body 12 includes an upper surface 26, a lower surface 28, and a plurality of sides or side surfaces 30 and 32 each extending between upper and lower surfaces 26 and 28. Fluid chambers 16, 18 and the other not numbered fluid chambers comprising cells within inflatable body 12 are all recessed slightly from sides 30 and 32, and the opposite sides not visible in FIG. 1. Chamber 14 extends all the way around the chambers forming the cells in the cushion, such that chamber 14 can be placed selectively in fluid communication with each of the other chambers in inflatable body 12, in a manner further discussed herein.

Device 10 further includes an inflation valve 20 configured to connect with a pump or the like, or be manually operated or blown into, and defining an inflation port 22. A cap 24 may be provided for selectively closing port 22 in a manner that will generally be familiar to those skilled in the art. While device 10 is shown in the context of a mattress or the like, it should be appreciated that the present disclosure is not thereby limited, and a wide variety of other inflatable devices are contemplated within the context of the present disclosure. For instance, a multi-chamber inflatable raft, fixed flotation platform, or any other buoyant and floatable device could fall within the scope of the present disclosure. It should further be appreciated that the teachings set forth herein are not strictly limited to inflatable devices, and certain applications outside of this context will be readily apparent to those skilled in the art in view of the teachings set forth herein.

Figure 2:
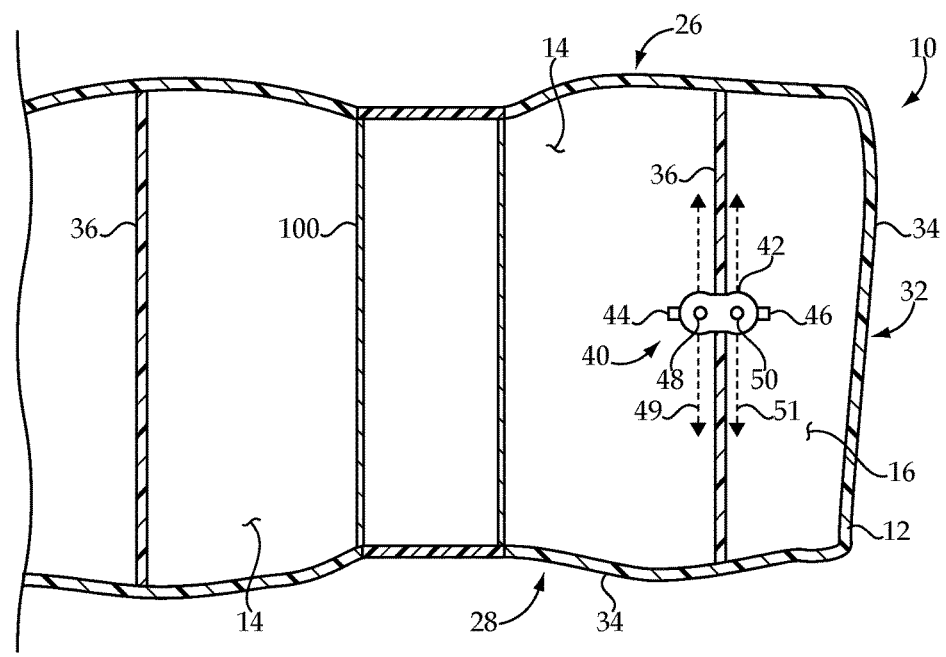
FIG. 2 is a sectioned view taken along line 2-2 of FIG. 1.

Device 10 may further include a valve assembly 40 positioned at least partially within inflatable body 12, and in a practical implementation strategy a plurality of valve assemblies 40. Each of valve assemblies 40 controls fluid communication between a first fluid chamber and a second fluid chamber in device 10. In the illustrated embodiment, each valve assembly 40 controls fluid communication between one of the cells, chambers 14 and 18, and outer chamber 16. Valve assemblies 40 also might control fluid communication between the individual cells such as between cells 14 and 18. Inflation valve 20 might also be or include a valve assembly similar or identical in construction to valve assemblies 40. Referring also now to FIG. 2, there is shown a sectioned view taken along line 2-2 of FIG. 1 and illustrating valve assembly 40 controlling fluid communication between chambers 14 and 16. FIG. 2 also illustrates an exterior wall 34 of inflatable body 12, and a plurality of interior walls 36. It can be seen from FIG. 2 that one of the interior walls 36 forms a dividing wall between chambers 14 and 16, and valve assembly 40 is positioned in and through interior wall 36. Also shown in FIG. 2 is a stiffening column or the like 100, optionally part of the present design.

Valve assembly 40 includes a valve body 42 having formed therein a first port 44 fluidly connected to first fluid chamber 14, and a second port 46 fluidly connected to second fluid chamber 16. Valve assembly 40 further includes a plurality of compound valves 48 and 50 positioned within valve body 42. The plurality of compound valves 48 and 50, typically but not necessarily a total of two compound valves, are operable to control fluid communication between ports 44 and 46 and thus chambers 14 and 16 in a unique manner dependent upon an orientation of valve assembly 40. In a practical implementation strategy, compound valves 48 and 50, and their constituent primary and secondary valves to be described below, reciprocate within valve body 42 to perform this function. In a practical implementation strategy, valve assembly 40 has an orientation within inflatable body 12 where the primary and secondary valves in each of compound valves 49 and 50 are movable between closed and open positions along common axes 49 and 51, respectively, extending vertically between upper surface 26 and lower surface 28.

The orientation of valve assembly 40 may be fixed within inflatable body 12, such that flipping over device 10 adjusts compound valves 48 and 50 between open and closed states. It will thus be appreciated that a person can inflate device 10 in a first orientation, where all of the individual inflatable cells or other fluid chambers will be in fluid communication with at least one other fluid chamber by way of one of valve assemblies 40. Device 10 can then be flipped over and the fluid communications blocked. In this way, displacement of fluid between and among individual fluid chambers in a device can occur freely or relatively freely when the device is in one configuration, but is limited when the device is in a flipped over configuration. In the case of inflatable cushions such as inflatable beds and the like fluidly isolating individual inflatable cells once inflated is contemplated to substantially improve user comfort and device integrity over conventional strategies where fluid communication is unrestricted throughout the device. Those skilled in the art will also recognize that buoyant inflatable devices such as rafts will benefit from such selective fluid isolation between and among individual cells, particularly in the case of protection from failure of the overall device should a leak occur. While certainly inflatable devices are known where individual inflatable cells are isolated from one another, the present disclosure is contemplated to provide substantial advantages with respect to ease of use and equipment simplicity and reliability insofar as such known strategies are concerned. Rather than manually or electronically operating valves or seals, or relying upon one-way valves or the like, the present disclosure allows the orientation of the valve assembly itself to determine whether or not fluid communication between fluid chambers is possible. In still other instances, the teachings of the present disclosure might be applied to devices and systems where, instead of flipping over a device to control the state of the valve assembly and thus fluid communication, the valve assembly itself is rotated within a device. Ballast tanks in a floating or land vehicle might be selectively connected to one another or disconnected from one another using valve assemblies according to the present disclosure. Still other applications lie in the field of industrial processes where fluid communication between fluid chambers is desired to be selectively controlled.

Figure 3:
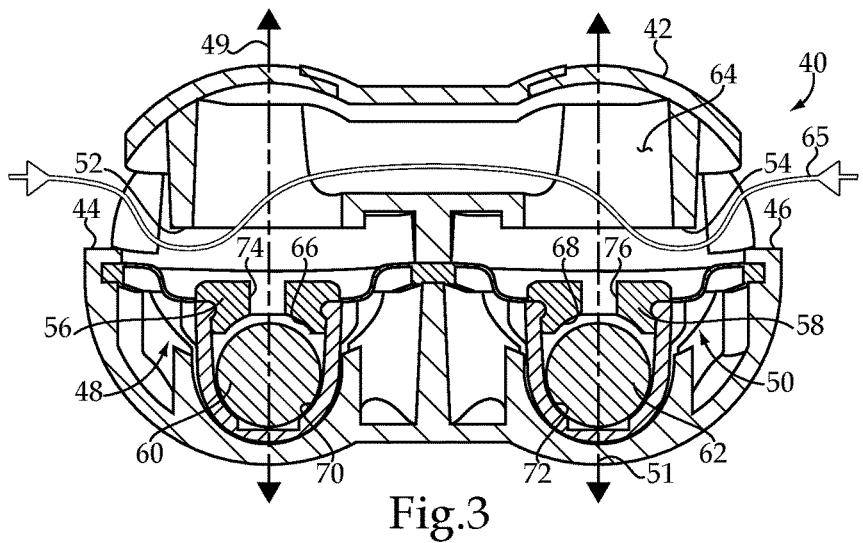
FIG. 3 is a sectioned side diagrammatic view through a valve assembly in a first state, according to one embodiment.
Figure 4:
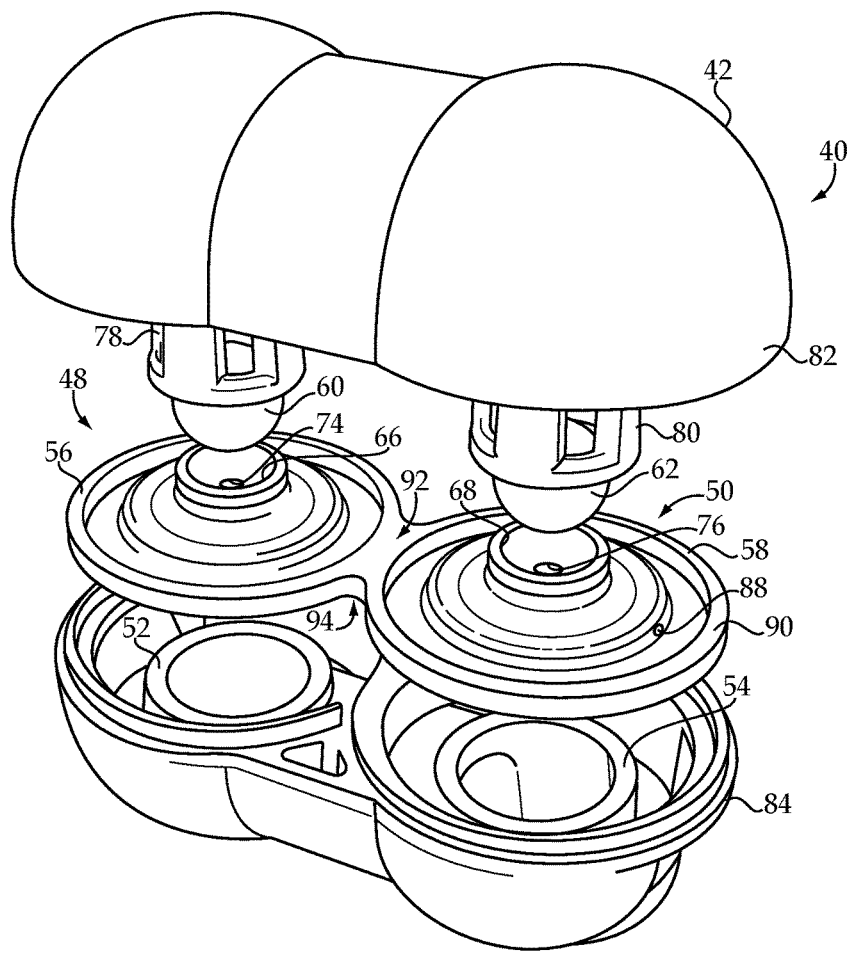
FIG. 4 is a disassembled view of a valve assembly, according to one embodiment.

Referring now to FIG. 3, there is shown a sectioned view through valve assembly 40 illustrating additional features. It can be seen from FIG. 3 that each of compound valves 48 and 50 includes a primary valve member 56 and 58, respectively, and a secondary valve member 60 and 62, respectively. Valve body 42 further defines a plurality of primary valve seats 52 and 54 positioned in series fluidly between first port 44 and second port 46, such that blocking of either of primary valve seats 52 and 54 blocks fluid communication between first and second ports 44 and 46. A passage 64 extends through valve body 42, and through valve seats 52 and 54. An arrow 65 illustrates fluid communication all the way through valve body 42. Each primary valve member 56 and 58 is movable between a closed position blocking one of primary valve seats 52 and 54 and an open position. Each of primary valve members 56 and 58 further defines a secondary valve seat 66 and 68, respectively. Each of secondary valve members 60 and 62 is movable between a closed position blocking one of secondary valve seats 66 and 68, and an open position. Each primary valve member 56 and 58 further defines an orifice 74 and 76, respectively, which orifice is blocked or open depending upon whether the corresponding secondary valve is in contact with and sealing the corresponding secondary valve seat. Referring also now to FIG. 4, there is shown a disassembled view of valve assembly 40, illustrating a first valve body piece 82 and a second valve body piece 84. When assembled, each of primary valve members 56 and 58 is clamped between first and second body pieces 82 and 84 and deformable between the corresponding closed and open positions, as will be further apparent from the following description. In the illustrated embodiment, and identified via reference numerals 70 and 72, each of the plurality of compound valves 48 and 50 further includes a stop 70 and 72, respectively, spaced a fixed distance from the corresponding secondary valve seat 66 and 68, and contacted by the corresponding secondary valve member 60 and 62 at its open position. Each of compound valves 48 and 50 may further include a cage 78 and 80 attached to the corresponding primary valve member and including the stop 70 and 72, respectively. Each of secondary valve members 60 and 62 may include a ball valve contained within a corresponding one of cages 78 and 80, as shown. It can be seen that cages 78 and 80 will snap-fit into engagement with the deformable material of primary valve members 56 and 58 in the illustrated embodiment, but could be attached by other means such as threads.

It can also be seen from FIG. 4 that primary valve members 56 and 58 are formed as an integral piece 90. Piece 90 forms a compound diaphragm valve with a first seating side 92, and an opposite seating side 94. An equalizing orifice 86 and 88 is formed by each of primary valve members 56 and 58, respectively, and communicates between sides 92 and 94. In alternative embodiments, each of valve members 56 and 58 might be formed as separate pieces. Each of primary valve members 56 and 58 may also be understood as a diaphragm valve member, but might be a different type of valve, such as potentially a disc valve, non-deformable, in other embodiments. Each of secondary valve members 60 and 62 might also be designed differently, and instead of a ball valve or the like seating against a spherical valve seat, could include a poppet valve seating against a conical valve seat, a pin or rod type valve, or still another design. As discussed above, flipping over valve assembly 40 enables the movement of compound valves 48 and 50 to control fluid communication in the manner discussed herein. In a practical implementation strategy, each of secondary valve members 60 and 62 is freely movable under the force of gravity within the corresponding cage 78 and 80 so as to move between its closed and opened positions in response to flipping over valve body 42. In other embodiments, biasing springs or potentially even electrical actuators or the like could be incorporated into the design to various ends. Each of secondary valve members 60 and 62 may have sufficient mass to induce deformation, such as elastic deformation, of primary valve members 56 and 58 between their closed and open positions. In a practical implementation strategy, housing pieces 82 and 84 may be molded plastic, diaphragm piece 90 may be molded rubber or rubber-like material, and secondary valve members 60 and 62 may be metallic. Cages 78 and 80 may also be molded plastic or rubber or rubber-like materials. In the illustrated embodiment, a total of two primary valve members and a total of two secondary valve members, are provided, however, in alternative embodiments additional compound valves could be positioned within a fluid flow path between ports so as to control fluid communications there between.

INDUSTRIAL APPLICABILITY

Figure 5:
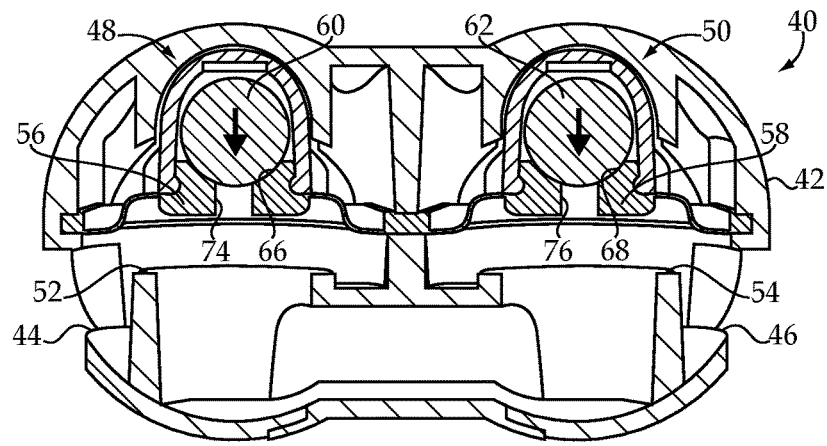
FIG. 5 is a sectioned side diagrammatic view of a valve assembly in another state, according to one embodiment.

Referring to the drawings generally, but in particular now to FIG. 5, there is shown valve assembly 40 as it might appear having been flipped over from the orientation shown in FIG. 3. With valve assembly 40 flipped over, secondary valves 60 and 62 can fall under the force of gravity and seat upon valve seats 66 and 68, covering orifices 74 and 76. The weight of secondary valves 60 and 62 also bears down upon primary valve members 56 and 58, giving them a tendency to deform and move toward seats 52 and 54.

Figure 6:
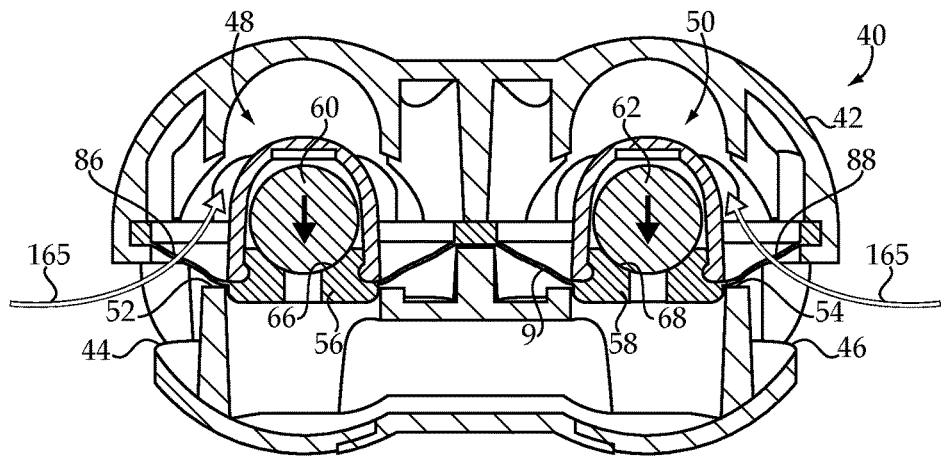
FIG. 6 is a sectioned side diagrammatic view of a valve assembly in yet another state, according to one embodiment.

Referring now to FIG. 6, primary valves 56 and 58 have moved to their closed positions, such that seats 52 and 54 are blocked, and fluid communication between ports 44 and 46 is closed. In the illustrated embodiment, a web 97 and 99 of each of primary valves 56 and 58 makes sealing contact with seats 52 and 54. In alternative embodiments, the particular contact pattern might be different, for instance a different part of primary valves 56 and 58 than a web or the like might perform the sealing function. The state depicted in FIG. 6, fluid communication through equalizer orifices 86 and 88 as depicted via arrows 165, provides incoming fluid pressure urging compound valves 48 and 50 down so that the sealing against seats 52 and 54 is further enhanced. This is generally due to incoming pressure from the sides being higher than pressure that is in the space under the seated primary valve members 56 and 58. It can readily be seen that in an inflatable cushion or the like, a person lying on the cushion by virtue of their body weight will increase the fluid pressure as depicted via arrows 165.

Figure 7:
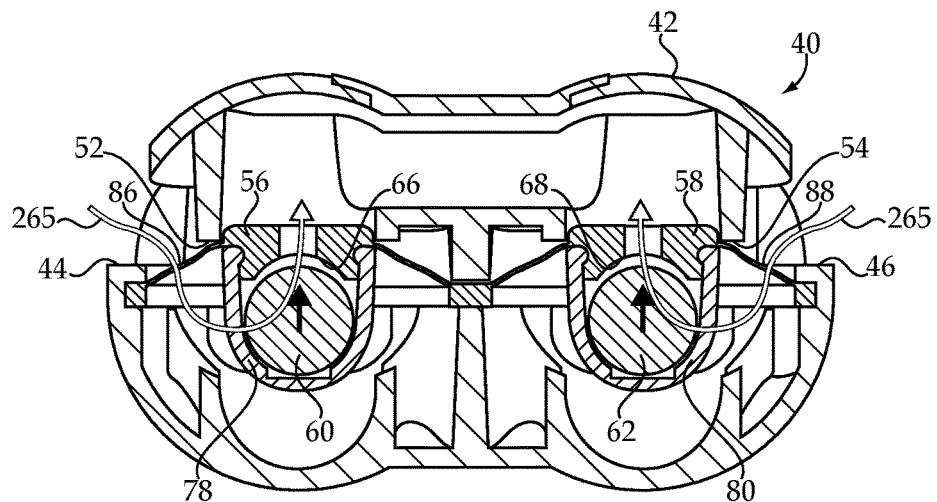
FIG. 7 is a sectioned side diagrammatic view of a valve assembly in yet another state, according to one embodiment.

Referring now to FIG. 7, with valve assembly 40 flipped back over, secondary valves 60 and 62 fall off their seats under the force of gravity, and enable fluid flow, as shown via arrows 265, past seats 66 and 68. With secondary valve members 60 and 62 trapped in cages 78 and 80, primary valve members 56 and 58 are now free to fall into their fully opened positions, unblocking seats 52 and 54, and re-establishing fluid communication between ports 44 and 46.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of controlling fluid communication between a first fluid chamber and a second fluid chamber comprising:
    flipping over a valve assembly including a valve body having formed therein a first port and a second port fluidly connected to the first and second fluid chambers, respectively;
    moving a plurality of primary valves within the valve body to contact a plurality of primary valve seats defined by the valve body and positioned in fluid series between the first and second ports, in response to flipping over the valve assembly;
    moving a plurality of secondary valves within the valve body to contact a plurality of secondary valve seats each defined by one of the primary valves, in response to flipping over the valve assembly;
    wherein the first and second fluid chambers are in a multi-chamber inflatable device, and flipping over the valve assembly includes rotating the multi-chamber inflatable device 180 degrees; and
    blocking fluid communication between the first fluid chamber and the second fluid chamber via the moving of the primary and secondary valves.

2. The method of claim 1 wherein moving the plurality of primary valves includes deforming the primary valves via a mass of the secondary valves.

3. A method of controlling fluid communication between a first fluid chamber and a second fluid chamber comprising:
    inverting a valve assembly including a valve body housing a plurality of compound valves, and having a first port and a second port fluidly connected to a first fluid chamber and a second fluid chamber, respectively, each compound valve comprising a primary valve and a secondary valve;

wherein the valve assembly has an orientation in an inflatable body in which an axis of reciprocation of each one of the compound valves extends vertically between an upper surface of the inflatable body and a lower surface of the inflatable body;

moving the primary valves within the valve body in a travel direction from an open position to a closed position in response to inverting the valve assembly, the closed position being defined in each compound valve as the primary valve being in contact with a primary valve seat, and positioned in fluid series between the first port and the second port;

moving the secondary valves within the valve body in the travel direction in response to inverting the valve assembly, such that each secondary valve comes into contact with a secondary valve seat defined by one of the primary valves; and blocking fluid communication among the two fluid chambers by inverting the valve assembly.

4. The method of claim 3 wherein the axis of reciprocation of each compound valve is parallel to one another.

5. The method of claim 3 wherein the primary valve and the secondary valve of each compound valve are drawn at least in part by gravity to the open position or the closed position depending on an orientation of the valve assembly.

6. A method of making a multi-chamber inflatable device comprising:

installing a valve assembly in the multi-chamber inflatable device, the valve assembly including a first compound valve and a second compound valve configured to block fluid communication between a first port and a second port of the valve assembly when inverted and to permit the fluid communication when not inverted; and fluidly connecting the first port and the second port in the valve assembly with a first fluid chamber and a second fluid chamber in the multi-chamber inflatable device, such that when the multi-chamber inflatable device is in a first orientation the valve assembly is inverted and blocks fluid flow between the first fluid chamber and the second fluid chamber, and when the multi-chamber inflatable device is in a second orientation the valve assembly is not inverted and the compound valves are adjusted via gravity to permit fluid flow between the first fluid chamber and the second fluid chamber.

* * * * *